Jan. 7, 1930.  P. GRABLER  1,742,389

COPYHOLDER

Filed Feb. 15, 1927  4 Sheets-Sheet 2

INVENTOR.
Peter Grabler
by Parker & Prochnow
ATTORNEYS.

Jan. 7, 1930.  P. GRABLER  1,742,389
COPYHOLDER
Filed Feb. 15, 1927  4 Sheets-Sheet 4

Patented Jan. 7, 1930

1,742,389

UNITED STATES PATENT OFFICE

PETER GRABLER, OF ROCKY RIVER, OHIO, ASSIGNOR TO GEOFFREY STEVENSON, OF BUFFALO, NEW YORK

COPYHOLDER

Application filed February 15, 1927. Serial No. 168,327.

This invention relates to improvements in copy holders or devices for use by typists and others which comprise a plate or support to which the copy is secured, and a cooperating line guide, one of which is adapted to be raised or moved step by step relatively to the other for indicating successive lines as the copying proceeds.

One of the objects of the invention is to provide an improved, practical and simplified copy holder of the sort mentioned which will be efficient in its operation, inexpensive, durable and compact in construction and substantially noiseless in use.

Other objects are to provide improved lifting, holding and releasing means or clutches for the vertically movable copy support or part which will be positive and reliable in action; also to provide improved operating means for the lifting, the holding and releasing clutches, and to mount these operating means in a manner to facilitate the operation and control of the copy holder; also to provide improved means for housing or protecting the operative parts of the device, including the lifting and holding clutches, and their operating members; and also to improve copy holders or devices in various other respects hereinafter described and set forth in the claims.

In the accompanying drawings.

The copy holder or device shown in the drawings to illustrate an embodiment of my invention comprises a stationary, upright frame 20 including a pair of spaced, parallel, cylindrical guide rods or members 21 rigidly connected at their upper and lower ends to suitable horizontal cross members. The copy support, in the form of a substantially flat plate 22 is guided to move up and down on the guide rods 21 by guideways or flanges 23 at the opposite side edges of the plate, and which embrace said tubes 21.

An adjustable but relatively stationary, horizontal line guide 25 extends across the front of the copy support 22 and is pivotally connected to the frame 20 in rear of said copy support.

At the top edge of the copy support 22 there is a cross member 26 of angle formation having one flange 27 extending downwardly and secured to the front face of the plate 22, and its other flange 28 extending rearwardly in a horizontal plane and disposed so as to form a rest for the turned over or finished sheets of the copy. To each of the opposite ends of the cross member is rigidly secured an upwardly and forwardly extending plate 29, which plates are adapted to form bearing lugs for the pivot portions or pintles 30 of a copy clamp or device, which may consist of a horizontal rod 31 bent to form offset end pivots 30 and having spaced copy-engaging sleeves 32 of rubber or the like thereon. This clamp is formed and positioned so as to yieldingly engage the face of the copy and clamp it in position against the front of copy support 22. Suitable tension springs 33 connected to the rod 31 and to the copy support yieldingly press the clamp rod against the copy and permit said rod to be swung upwardly out of contact with the copy to allow the same to be placed in position and removed, or the sheets thereof turned over. The ends of the rod are bent or offset, as at 34 to form handle portions for convenient manipulation of the copy clamp.

The guide rods 21 of the stationary frame are rigidly connected at their lower ends to a horizontal base or cross bar 35 being threaded for this purpose so as to extend through threaded holes in the base bar 35, and are secured by nuts 37. The upper ends of the tie rods pass through holes in lateral extensions 38, Figs. 9 and 10, of a horizontal, rearwardly extending top flange 39 of a vertical, sheet metal stiffening or reinforcing plate 40 which extends downwardly from said flange between said rods 21 directly back of the copy support 22. The upper ends of the rods 21 are secured to the extensions 38 by screws 41 which are threaded into said rods. The guide rods 21 are preferably surrounded as shown in section in Fig. 5, by loosely fitting tubular sleeves 36, formed of fiber or other sound-deadening material. The guideways 23 of the plate 22 are of V-formation, so that the sleeves 36 engage snugly within these guideways to form a smooth and substantially noiseless contact between these parts.

An adjustable leg or rest 45 extends forwardly from the stationary frame 20, at one side of the copy holder to permit the device to be supported vertically or at desired inclinations. On this leg the actuating and controlling levers for the clutches used for manipulating the copy support are carried. This leg 45 is suitably pivoted to the frame 20, as by a clamp screw 46 which passes through a hole in the rear end of said leg and screws into a hole in an upwardly projecting lug 47 on the extended end of the bottom cross bar 35. By this arrangement the leg 45 can turn about the screw 46, when the same is loosened, so as to fold up alongside the edge of the copyholder for compactness during storage or transportation, and this construction also permits the frame 20 and copy support 22 to be tilted to various angular positions at the convenience of the user. A clamp plate or washer 48 is preferably arranged beneath the head $46^a$ of the screw 46 and friction washers 49 interposed between said plate, said lug 47 and the opposite faces of the leg 45 hold said leg and the frame 20 securely in their intended relation when said screw is tightened.

Figure 6:
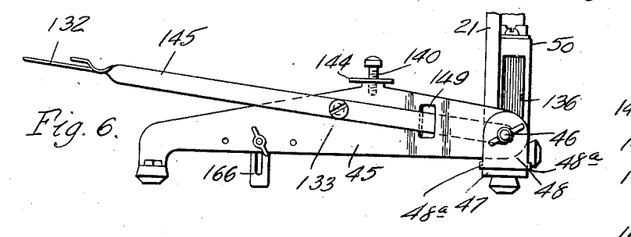
Fig. 6 is a side elevation of the lower portion of the copy holder, viewed from the right hand side of Fig. 1.
Figure 11:
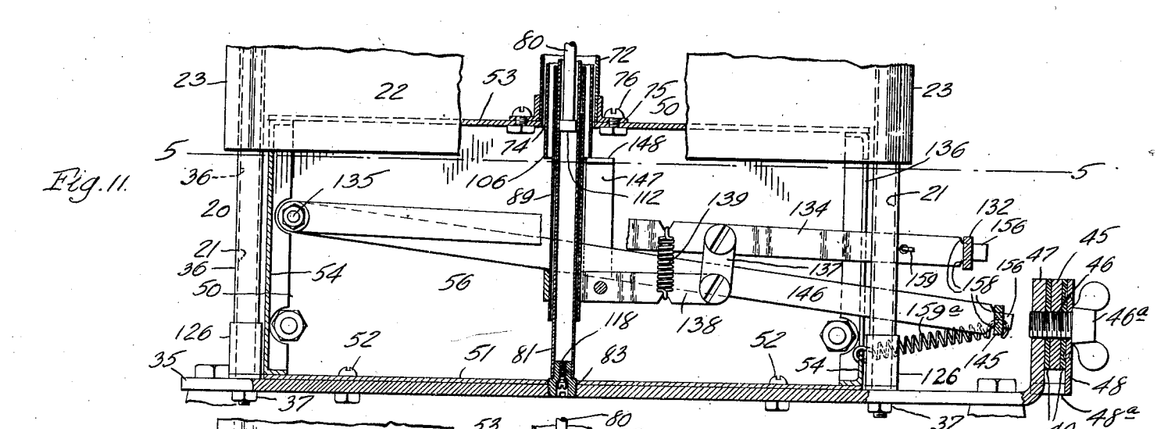
Figs. 11 and 12 are vertical sectional elevations, on an enlarged scale, of the lower portion of the copy holder, showing the operating mechanism for the copy support in two different positions.
Figure 12:
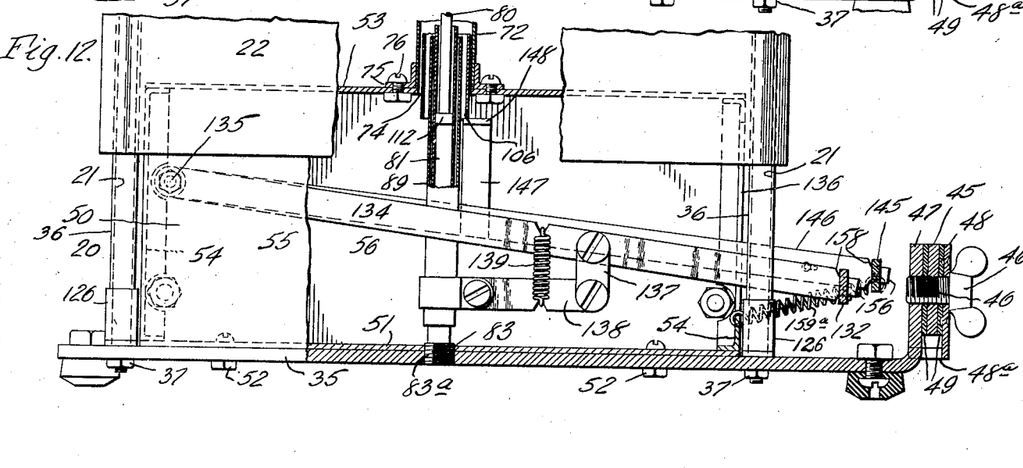

Preferably the clamp plate 48 is provided with projections or laterally extending ears $48^a$, Figs. 6, 11 and 12, which embrace opposite edges of the lug 47, thereby preventing said plate from turning and loosening the screw stud 46 when the leg 45 is swung about its pivot.

Extending transversely between the lower portion of the guide rods 21 is a narrow, rectangular housing or enclosure 50, suitably formed, for example, of sheet metal and including a bottom flange 51, preferably rigidly attached to the base rail or bar 35, as by bolts 52, a corresponding horizontal top flange 53, opposite upright end pieces 54, and front and back walls or plates 55 and 56.

Figures 2, 3, 4:
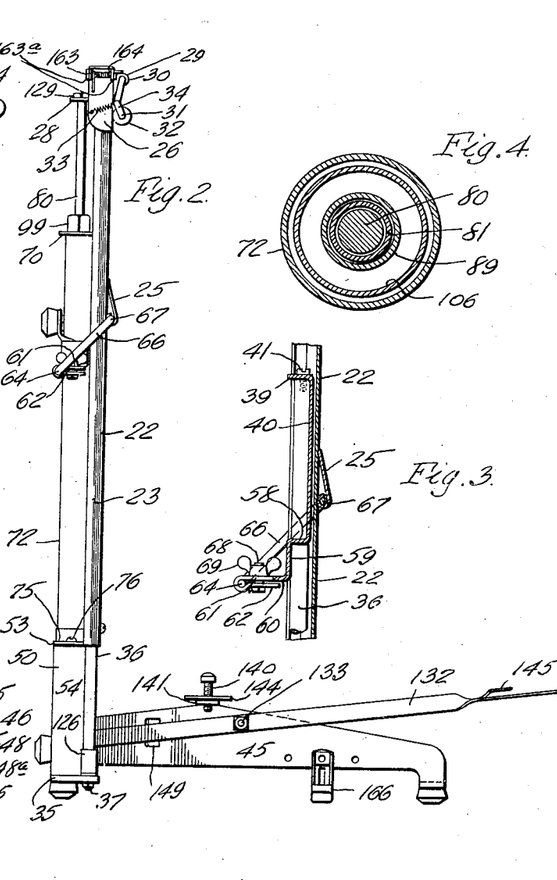
Fig. 2 is a side elevation thereof, viewed from the left hand side of Fig. 1.
Fig. 3 is a fragmentary, vertical, transverse section, on an enlarged scale, of the copy holder on line 3—3, Fig. 1.
Fig. 4 is a horizontal, sectional view, on a still larger scale, on line 4—4, Fig. 16, of the lifting clutch operating member, the releasing member for the holding clutch and the stationary guiding and housing members therefor.
Figures 7, 8, 9, 10:
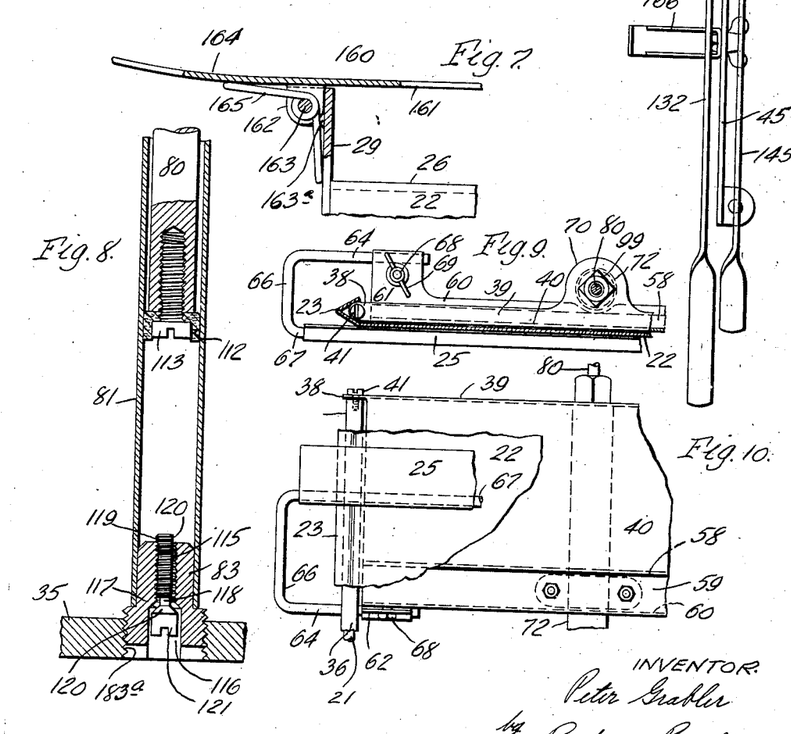
Fig. 7 is a fragmentary elevation, partly in section, of the movable clip or device for holding the turned over or rejected sheets of the copy.
Fig. 8 is a vertical section, on an enlarged scale, of the cushioning means for controlling and rendering substantially noiseless the descent of the copy support.
Fig. 9 is a fragmentary, sectional plan view of a portion of the stationary frame, copy support and line guide of the device.
Fig. 10 is a fragmentary face view of the parts of the copy holder shown in Fig. 9.

In the construction shown, see Figs. 3, 9 and 10, the sheet metal plate 40, before mentioned, has its lower edge portion bent rearwardly to form a horizontal flange 58, thence downwardly to provide a depending web 59 and thence again rearwardly, forming a narrow horizontal edge flange 60. These portions 58, 59 and 60 preferably extend continuously entirely from side to side of the plate 40. As shown particularly in Figs. 3 and 10, the bottom flange 60 has rearward extensions 61 at its ends provided with downwardly and forwardly bent yielding portions 62. These bent parts form bearings which frictionally embrace the opposite pivot ends 64 of hinge arms 66 for the line guide 25. As shown these hinge arms 66 extend forwardly at the side edges of the copy support 22 and are connected, in front of said support, by a cross rod 67 about which the lower edge of the line guide 25, which is preferably formed of sheet metal, is secured, so that the line guide can be pivotally adjusted about the hinge rod. The hinge arms are thus pivotally supported in clamping bearings formed by integral parts of the frame plate 40, and the yielding portions 62 thereof can, if desired, be adjusted by clamping screws 68 passing through the bearing parts so as to grip the pivots of the hinge rod tightly, or to allow said rod to turn therein with sufficient friction to hold the line guide in any adjusted position, as desired.

Substantially midway of its ends, the top flange 39 of the frame plate 40 is provided with a rearwardly projecting part 70, shown in Fig. 9, having therein a round hole 71 with which registers the upper, open end of an upright stationary tube or cylindrical housing 72. The lower end of this tube terminates in a similar hole 74 in the top flange 53 of the housing 50, the tube preferably having a fixed sleeve or part at said end provided with an annular, horizontal flange 75 for securing it rigidly to the flange 53, as by bolts 76 or the like.

A guide or lift rod 80, connected to and depending from the top flange 26 of the copy support at the back thereof extends through the upper portion of the tube 72 into a second fixed tube or cylinder 81, disposed concentrically within the housing tube 72 with its open upper end disposed below the top of said outer tube 72. The lower end of this inner tube 81 projects below the lower end of the outer tube 72 and has secured in its lower end a plug 83 which has a threaded enlargement below said end which is screwed into a threaded hole 183ª in the bottom cross bar 35 of the copy holder and secures the inner tube rigidly in place. Disposed within the housing tube 72 are the lifting clutch and the operating member for causing the lifting clutch to engage and lift the rod 80 and the attached copy support, the holding clutch which automatically engages the rod 80 to hold the copy support in the various positions to which it is raised by the lifting clutch, and also the releasing member for releasing said rod from the holding clutch to permit the descent of the copy support.

In the present disclosure the clutches are of the ball type, the lifting clutch being designated 84 and the holding clutch 85.

The lifting clutch 84 preferably comprises a movable cup or annular member 86 containing loose clutch balls or elements and having a downwardly tapered inner face 87, and a reduced sleeve or portion 88 by which it is rigidly secured to the upper end of an operating member 89 preferably in the form of a tube which extends downwardly through the housing tube 72 and surrounds the fixed inner tube 81. The balls or analogous loose clutch elements 90, disposed within the member 86, are adapted, when the operating member 89 is lifted, to wedge between the inclined face 87 and the surface of the rod 80 and grip the rod, thus elevating this rod and its attached copy support with said member 89, see Fig. 15.

Preferably the balls 90 are yieldingly pressed downwardly in the clutch member 86, and prevented from displacement and rattling by a rubber sleeve 91 or other suitable spring, loosely surrounding the rod 80 between a washer 92 engaging the balls and a disk 93, which is fixed to and closes the upper end of the cup 86.

The holding clutch 85 also comprises a cup or annular member 94 containing loose clutch balls or elements and having an inner downwardly tapering face 95 and a cylindrical part 96 which fits and is secured in the upper end of the stationary housing tube 72. The lower portion of the part 96 is preferably hollow and forms a depending, annular flange or skirt 97. The upper end of the outer tube 72 is preferably disposed intermediate of the ends of the cup 94 and forms a shoulder 98 against which the lug 70 of the frame plate 40 is clamped by a hollow cap or nut 99 which is screwed on the threaded upper portion of the cup 94, thereby holding the upper part of said tube 72 rigidly but removably in place. The rod 80 extends through the nut 99 and preferably a coil spring 101 or other yielding member is disposed between the top of said nut and a washer 102 resting on the balls 103 or other clutch elements within the cup 94 and surrounding the rod 80 for yieldingly holding the balls in place.

Figure 13:
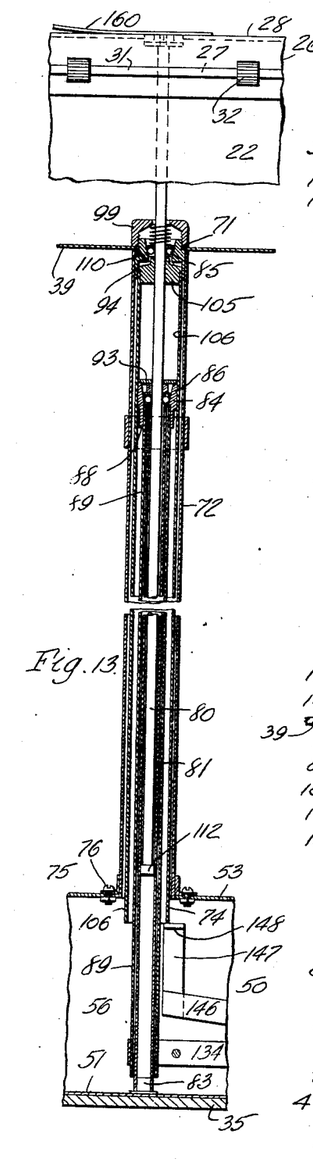
Fig. 13 is a vertical section, partly broken away, of the clutch mechanism and part of the operating means therefor.
Figures 14, 15:
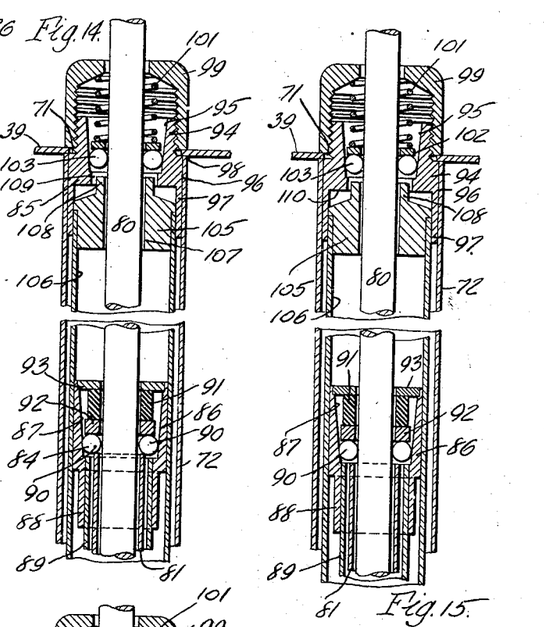
Fig. 14 is a vertical section, on a still larger scale, of the lifting and holding clutches and part of the releasing means for the holding clutch, showing these parts with the holding clutch in gripping relation to the lift rod of the copy support.
Fig. 15 is a similar view showing the lifting clutch in lifting position.

When the parts of the copy holder are at rest, as shown in Figs. 13 and 14, the upper end of the inner stationary tube 81 extends within the lifting clutch 84 and engages the balls 90 inwardly beyond their vertical axes and, acting against the yielding cushion 91, forces the balls upwardly along the tapered face 87 sufficiently to permit the balls to release the rod 80. The rod 80 and copy support 22 will then tend to descend by gravity, which movement, however, will cause the rod 80 to react on the balls 103 of the holding clutch 85, moving them downwardly along the tapered face 95 so that they will wedge between said face and said rod to prevent the descent of the copy support. If on the other hand, the lifting clutch is raised by its operating tube 89, its tapered face 87 will first move upwardly relatively to the balls 90, until the balls are lifted off the end of the fixed tube 81 and wedge between said face and said rod. In this manner the rod will be gripped by the lifting clutch and elevated thereby directly after the upward movement of the clutch has been initiated, see Fig. 15. Moreover, by the described manner of mounting the inner tube 81, this tube can be adjusted up or down to position its upper end in exactly the correct relation to the lifting clutch 84 by turning the plug 83 in one direction or the other in the base bar 35. If the lifting clutch is intermittently actuated, the copy on the copy support 22 will be moved step by step upwardly past the line guide 25, as upward movements of the rod 80 will cause the balls 103 of the holding clutch to roll upwardly along the tapered face 95 of that clutch and allow the free upward movement of the rod therethrough. Any tendency of said rod to move downwardly will, however, be prevented by the instant wedging action of the balls of the holding clutch as previously explained.

In order to release the rod 80 from the holding clutch 85 and permit the copy support to descend, means are provided for disengaging the balls 103 of said clutch from said rod when the lifting clutch 84 is in its released position shown in Fig. 14. The means shown for this purpose comprises a releasing member, such as a ring 105 movable lengthwise in the housing tube 72 and fixed to the upper end of an operating member, such as a tube 106 disposed within and adjacent the wall of the tube 72. The ring 105 preferably has a sliding fit within and is guided by the depending flange 97 of the clutch 85. By making the releasing member 106 tubular, the cup 86 of the lifting clutch can be disposed within the tube 106 with its outer wall slidingly engaging the inner surface of said tube, and is thereby maintained in axial alinement with the tube 72, and is guided in its endwise movements.

Figures 16, 17:
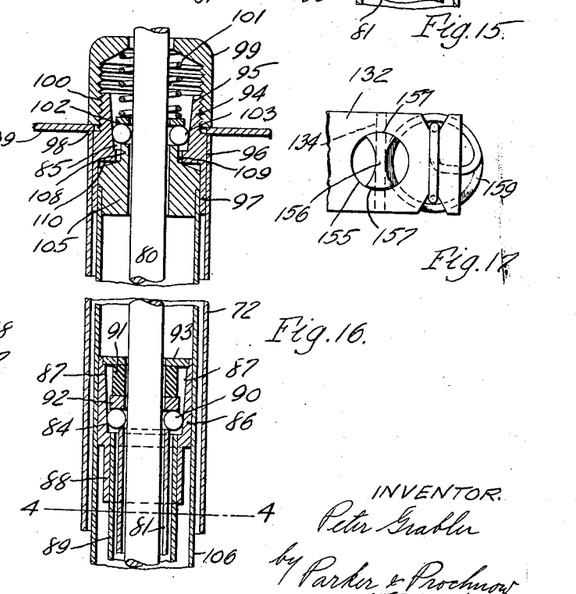
Fig. 16 is another similar view showing the holding clutch in released position to permit the copy holder to descend.
Fig. 17 is a side elevation, on an enlarged scale, of a connection between one of the operating levers and its companion lever.

The releasing ring 105 surrounds the rod 80 out of contact therewith and has an upper reduced end 108 which extends through a hole 109 in the lower end of the clutch member 94, with its top face normally disposed a short distance below the balls 103, when in their lowest or rod holding position. By a slight upward movement of the tube 106, the part 108 will engage and release the balls from engagement with the rod 80 as they will move away therefrom along the tapered face 95 against the action of the spring 101, see Fig. 16. Preferably the ring 105 is formed to engage a shoulder or stop 110 on the clutch 85 to limit the upward movement of the ring and the extent to which the balls are elevated, thereby preventing unnecessary displacement of the latter.

It will be noted from the foregoing that the clutches for controlling the rod 80 and their respective operating members are housed in a compact manner within the tubular housing 72 with portions of said operating members extending downwardly within the narrow housing 50, so that these parts are concealed and protected and no unsightly operating mechanism, as thus far described, projects either forwardly of the copy support or rearwardly beyond the rear wall 56 of said housing 50.

Means of improved construction are preferably provided for permitting a controlled or retarded descent of the copy support 22, thereby preventing a sudden dropping and noisy fall of said support. For this purpose the lower end of the rod 80 is preferably provided with a piston or packing member 112, see Fig. 8, such as a cup-shaped leather washer, secured by a screw or the like 113. This member 112 has a snug sliding fit in the bore of the stationary guide tube 81 and the lower end of said tube has a restricted opening, the area of which can be adjusted to regulate the escape of air therefrom in the downward movement of said rod 80, and thereby control as desired, the descent of the copy holder. In the construction illustrated the plug 83 (before mentioned) in the lower end of the tube 81 has a screw-threaded hole 115 extending lengthwise therethrough and has an enlarged lower end in communication with the atmosphere, and a conical seat 117. A screw 118, rotatable in the threaded hole 115, has a shank mutilated or cut away along one side, as at 120, to permit air to pass the shank through said hole 115. The screw 118 has a conical part 120 which is complementary to the seat 117, and terminates in a head 121 which is located in, and is of smaller diameter than the enlarged lower end of the hole 115. By turning the screw to move its tapered portion 120 towards or from the seat 117, the escape of air through the aperture 116 can be varied so that the descent of the copy support can be nicely controlled as desired by appropriate adjustments of said screw, or the escape can be entirely cut off, if desired, by screwing the portion 120 tightly against the seat 117. This latter adjustment would be of advantage when the copy holder is to be transported, as by this means the rod 80, if moved to its lowest position, would be substantially held from movement in the tube 81.

Figure 1:
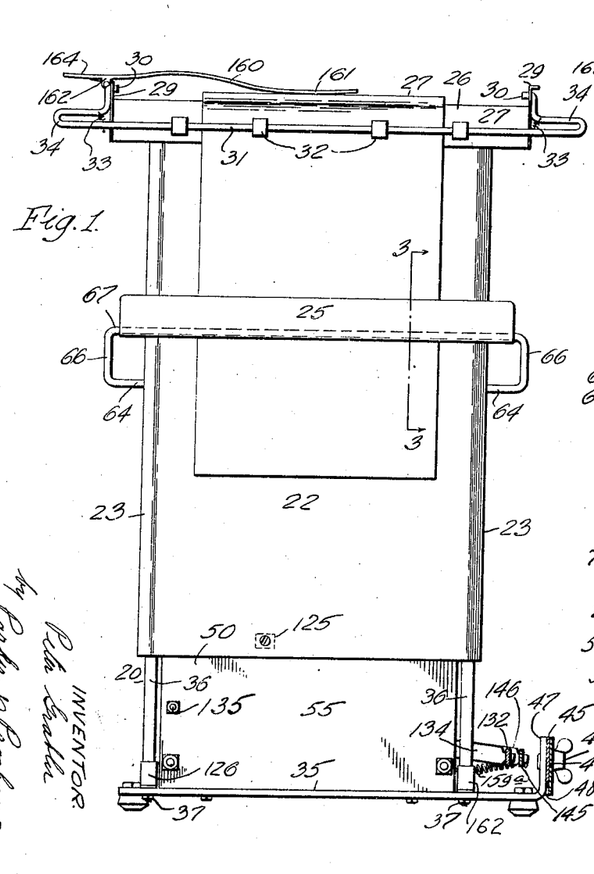
Fig. 1 is a front elevation, partly in section, showing one construction of a copy holder or device embodying my invention.
Figure 5:
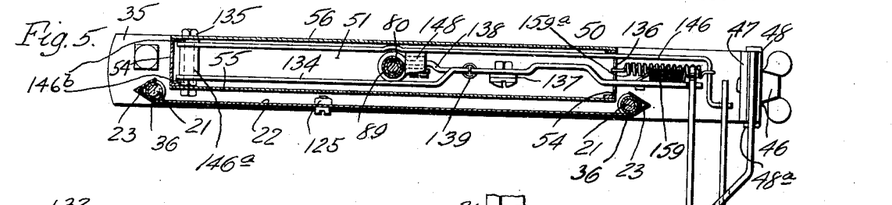
Fig. 5 is a plan view, partly in horizontal section on line 5—5, Fig. 11, of the copy holder.

The upward travel of the copy support 22 can be limited in any suitable way, as by a stop 125, Figs. 1 and 5, secured on the rear face of said support near its lower edge, and adapted to engage a fixed part of the frame, such as the flange 58 of the top frame plate 40. The lower position of the support 22 is likewise limited by suitable stops, preferably the resilient sleeves or buffers 126 surrounding the lower ends of the guide rods 21, and adapted to engage the lower edge of the copy support, whereby the descent of the copy support is rendered substantially noiseless. The position of the piston 112 of rod 80 is so positioned with reference to the lower edge of the copy support that the support will strike the stops 126 before the plunger reaches the adjustable member 118.

The means for actuating the operating member 89 of the lifting clutch 84 includes a forwardly extending lever 132 pivoted between its ends on the inner side of the leg 45 by means of a pivot stud or bolt 133.

The rear end of the lever 132 is operatively connected to one end of a second lever 134 (see Figs. 5, 11 and 12) which has its opposite end journalled on a horizontal pivot 135 fixed in the housing 50. The lever 134 extends transversely of the copy holder in the housing with its free end projecting through an aperture 136 in one side wall 54 thereof. The pivot 135 is preferably disposed at the opposite side of the clutch operating member 89 from the lever 132, and between its ends the lever 134 is connected, as by a pivoted link 137, to the free end of an arm 138 fixed to and projecting laterally from the lower end of the member 89. Preferably, a coil spring 139 is connected under tension between and to the lever 134 and arm 138 to prevent rattling between the parts. It will be seen from the foregoing that by depressing the front end of the lever 132 (which is suitably formed for engagement by a finger of the operator) the rear end of said lever, and the connected end of the lever 134 will be raised, causing the elevation of the lifting clutch operating member 89. By repeating the movement, the clutch balls 90 will intermittently grip and elevate the rod 80 step by step, as described.

Preferably, an adjustable stop of suitable form is provided for limiting the throw of the lifting clutch, so that the step movements of the copy support 22 can be regulated in accordance with the spacing of the lines of the copy. This stop, see Figs. 2, 5 and 6, preferably consists of a vertical screw 140 positioned above and in alinement with the lever 132, in a threaded hole in a lug 141 projecting laterally from the leg 45. By turning the screw, its lower end is moved towards or from the adjacent edge of the lever 132, so that when actuated, the lever will engage the stop, and in this manner its throw and the movement of the clutch 84 is varied. A suitable lock nut 144 on the screw 140 is arranged to engage the lug 141 to hold the screw 140 in its adjusted position. Any other suitable stop means for the lever 132 may be employed. An important feature of the described construction and relation of the lifting clutch 84 and the upper end of the guide tube 81 is that these parts form a positive stop for the return movement of the lifting clutch lever 132, operating member 89 and connecting parts without the necessity of providing additional means for this purpose. That is to say, as soon as the balls 90 in the return movement of the clutch engage the upper end of the tube 81, the entire clutch mechanism will be immediately arrested through contact with the tube 81, balls 90, washer 92, rubber sleeve 91 and disk 93 of the operating member. Moreover the resilient rubber sleeve 91 acts as a cushion to deaden the sound of the clutch movements.

The releasing member 106 of the holding clutch 85 is likewise actuated by a lever 145, preferably aranged alongside or adjacent the lever 132 and mounted to rock on the pivot 133. The rear end of said lever 145 is operatively connected to the free end of another transverse lever 146, which like the lever 134 is disposed within the housing 50 and is pivoted on the stud 135. Fixed to said lever 146, between its ends, is an upright finger 147 having at its upper end a lug 148 upon which the bottom of the releasing member 106 rests when in its lower inoperative position, Figs. 11 and 12. By depressing the front end of the actuating lever 145, the finger 147 is caused to elevate the releasing member 106 and project the upper end of the attached ring 105 into the holding clutch and release the balls 103 from the rod 80, thereby permitting the copy support to descend.

An important result of the foregoing construction is that, by depressing the lever 145 and releasing the rod 80 from the holding clutch 85, and at the same time intermittently depressing and releasing the other lever 132 for the lifting clutch 84, the copy holder or support can be lowered step by step to effect back spacing of the copy thereon. This novel control, made possible by the provision of the two operating levers, and the rigid connections between these and the respective clutches through the members 89 and 106, is very useful and adds greatly to the efficiency of the operator.

A resilient sleeve of rubber or the like 146$^a$ is arranged on the pivot 135 between and bearing against the two levers 134 and 146, see Fig. 5, and acting to yieldingly press these levers against a washer or part 146$^b$ disposed between each lever and the adjacent wall of the housing 50, whereby the levers can act without rattling or looseness.

Preferably, the leg 45 is offset rearwardly of the pivot 133, and the lever 145 is mounted on the pivot 133 at the outer side of said leg and extends through a hole 149 in the offset portion to permit the lever to connect with the transverse lever 146 at the inner side of and in axial alinement with the pivotal connection of the leg with the base bar 35. By this arrangement, a more balanced and compact construction is produced, and the necessity of providing a relatively long pivot for these levers projecting from one side of the leg and which would thus be likely to become loosened or twisted, is avoided. Suitable spacing washers or collars 150 are disposed between the levers 132 and 156 and the adjacent faces of the leg 45.

In order to permit the requisite play between the actuating lever 132 and the transverse lever 134, and at the same time provide for their ready connection and disconnection, the lever 132 is preferably formed with a circular hole 155, and the end of the other lever has a reduced end stud 156, one cross-dimension of which is substantially the same as the diameter of the hole 155 and into which it extends. In order to secure a smooth pivotal action, the opposite edges 157 of the stud 156 that engage the edges of the hole 155, are swaged or thickened and curved on substantially the same radius as said hole, see Fig. 17. The lever 134 is preferably formed between the stud 156 and the main portion of said lever with oblique shoulders 158, and the end of the lever 132 is yieldingly held on the stud against these shoulders by a coil spring or other tension member 159 connected at one end to said lever and at the other to the link, Figs. 5 and 17. In this manner the levers are detachably connected, the one can turn on or relatively to the other in operation, and the parts are yieldingly held in contact in a manner to prevent rattling or noise while in use, and automatically take up lost motion between the parts.

The levers 145 and 146 are detachably connected in a similar manner except that the spring 159 is replaced by a spring 159ª connected to the lever 145 and to the end wall 54 of the housing 50 in a position to effect a downward pull on the lever, and thus act to return the lever 145 and its clutch actuating mechanism to inoperative position after said lever has been actuated.

These pivotal connections between the finger levers 132 and 145 and their companion transverse levers are preferably located substantially adjacent the axis of the pivot for the leg 45, so that the actuating mechanisms for the lifting and holding clutches will operate properly in different angular adjustments of the leg, and the finger levers can also fold up with the leg to an upright position at the side of the upright frame.

Preferably, however, the pivotal connection between the levers 145 and 146 is disposed somewhat in front of the axis of the stud 46, so that when the leg 45 and its attached levers are folded up alongside the frame 20, this pivotal connection will move upwardly sufficiently to shift the release member 106 of the holding clutch to its clutch-releasing position. Consequently, should the copy plate 22 be accidentally extended or raised during the folding operation, the rod 80 thereof will be free, and the copy plate can be pressed into its lower or collapsed position without first unfolding the leg 45.

Means are preferably provided for yieldingly and releasably holding the turned over pages or finished sheets of the copy in position extending to the rear out of the way. For this purpose, a spring bar or clip 160 is used, said clip extending transversely above the top of the copy support and having a free end 161 formed to bear downwardly on said sheets that are turned back over the horizontal top flange 26 of the copy support 22. The clip 160 is provided with lugs 162 by which it is pivoted at one side of the copy holder, as on horizontal pivot 163 carried by lugs 163ª on one of the upstanding plates 29 of the copy support. One end of the clip projects outwardly beyond its pivot and forms an actuating finger piece 164, and a spring 165 preferably coiled about the pivot 163 and bearing against said finger piece and against said plate 29, yieldingly presses the inner end of the clip down against the turned over sheets. By pressing downwardly on the finger piece, the operator can move the clip to permit the sheets to be released or placed in position beneath the clip. Moreover by providing a clip of this character, pivoted at the side of the copy support to swing vertically, the clip can be swung to an upright position entirely out of the way at the side of the copy support, so that the sheets can be quickly and easily turned over the upper edge of the copy support.

If desired, an adjustable hook member 166, such as shown in Figs. 2 and 5 may be arranged on the leg 45 and adapted to engage beneath the side frame of a typewriter or other machine to aid in stationarily supporting the copy holder, and prevent it from tipping, especially when the frame 20 and copy support 22 are tilted rearwardly.

I claim as my invention:—

1. In a copy holder, the combination of a frame, a copy support mounted on and movable relatively to said frame, a lift rod secured to said support, a clutch which is engageable with said rod and is operable to move said copy support step by step in one direction, a stationary clutch carried by said frame and which is adapted to automatically yield relatively to and then grip said rod alternately with its engagement and movement by said first clutch to hold said copy support in different positions, means for actuating said first clutch, and means operable independently of the operation of said first clutch for releasing said second clutch to permit a return movement of said copy support.

2. In a copy holder, a frame and a copy support, one of which is movable relatively to the other, a lift rod connected to the movable member, a clutch which is engageable with said rod and is operable to move said member step by step in one direction, a stationary clutch carried by the other member and which is adapted to automatically yield relatively to and then grip said rod alternately with its engagement and movement by said first clutch to hold said movable member in different positions, means for actuating said first clutch, and means operable independently of the operation of said first clutch for releasing said second clutch to permit a return movement of said movable member.

3. In a copy holder, the combination of a frame, a copy support mounted on and movable relatively to said frame, a lift rod secured to said support, a tubular housing on said frame into which said rod extends, a reciprocable ball clutch arranged within said housing and which is operable to grip said rod to move said copy support step by step in one direction, a stationary ball clutch also disposed within said housing and which automatically yields to release said rod and then grips the same alternately with the engagement and movement of said rod by said first clutch to hold said copy support in different positions, and means within said housing for reciprocating said first clutch.

4. In a copy holder, the combination of a frame, a copy support mounted on and movable relatively to said frame, a lift rod secured to said support, a tubular housing on said frame into which said rod extends, a reciprocable clutch arranged within said housing and operable to grip said rod to move said copy support step by step in one direction, a stationary clutch within said housing and which automatically yields to release said rod and then grips the same alternately with the engagement and movement of said rod by said first clutch to hold said copy support in different positions, an independently movable releasing member for said holding clutch arranged within said housing, means for actuating said first clutch, and means independent of said first clutch for moving said releasing member to release said holding clutch.

5. In a copy holder, the combination of a copy support movable up and down, a lift rod secured to said support, a stationary, upright tubular housing into one end of which said lift rod extends, a fixed guide tube extending within the opposite end of said tubular housing and which receives and guides said lift rod, a reciprocable clutch in said housing operable to intermittently engage said rod to lift said copy support step by step, said clutch having an actuating member within and extending lengthwise of said housing and projecting from said last mentioned end thereof, actuating means connected to said member for operating said clutch, and a second clutch adapted to grip and release said rod alternately with said first clutch for holding said copy support in different positions.

6. In a copy holder, the combination of a copy support movable up and down, a lift rod secured to said support, a stationary, upright, tubular housing into one end of which said lift rod extends, a fixed guide tube extending within the opposite end of said tubular housing and which receives and guides said lift rod, a reciprocable clutch in said housing operable to intermittently engage said rod to lift said copy support step by step, said clutch having an actuating member within and extending lengthwise of said housing and projecting from said last mentioned end thereof, actuating means connected to said member for operating said clutch, a second clutch in said housing arranged to permit upward movement of said rod when moved by said first clutch and to grip and hold said rod to prevent downward movement of said rod, a releasing member extending lengthwise of said housing with one end adjacent said holding clutch and its opposite end also extending out of said last-mentioned end of said housing, and actuating means independent of said first clutch or its actuating means for engaging said extended end of said releasing member to move said member endwise to release said holding clutch from said lift rod and permit the direct descent of said copy support.

7. In a copy holder, the combination of a copy support movable up and down, a lift rod secured to said support, a stationary, upright, tubular housing into one end of which said lift rod extends, a clutch reciprocable lengthwise in said housing and having an actuating member extending lengthwise in said housing with an end projecting out of the lower end thereof, actuating means acting on said end of said member for moving said clutch to intermittently grip and lift said rod and copy support, a holding clutch in said housing adapted to grip and hold said rod when released from said first clutch, a member disposed in said housing with one end adjacent said holding clutch and its other end projecting out of said housing, and independent actuating means engageable with said end of said member to move the same endwise to release said holding clutch from said rod and permit the direct descent of said copy support.

8. In a copy holder, the combination of a copy support movable up and down, a lift rod secured to said support, a stationary, upright, tubular housing into which said rod extends, a fixed guide tube within said housing with its upper end terminating below the top of said housing and in which said lift rod moves, a reciprocable clutch disposed in said housing and encircling said rod adjacent said end of said guide tube and having loose clutch elements which, in one position of said clutch, rest on said end of said guide tube and are held thereby in inoperative relation to said lift rod, an actuating member for said clutch extending lengthwise in said housing to one end thereof, means without said housing for moving said member lengthwise to shift said clutch and move said clutch elements out of contact with said end of said guide tube and into gripping relation with said rod to elevate said copy support, and other clutch means for holding said rod when said first clutch is inactive.

9. In a copy holder, the combination of a copy support movable up and down, a lift rod secured to said support, a stationary, upright, tubular housing into which said rod extends, a fixed guide tube within said housing which receives and guides said lift rod, a clutch in said housing having loose clutch elements which, in one position of said clutch, rest on an end of said guide tube and are held thereby in inoperative relation to said rod, a tubular actuating member for said clutch encircling said guide tube and extending out of said housing, and actuating means connected with the extended portion of said actuating member and adapted to shift the same lengthwise to move said clutch and permit said loose clutch elements to grip said rod to elevate said copy support.

10. In a copy holder, the combination of a copy support movable up and down, a lift rod secured to said support, a stationary, upright, tubular housing into which said rod extends, a fixed guide tube within said housing in spaced relation thereto in which is guided said lift rod, a clutch within said housing operable for gripping and lifting said rod to elevate said copy support, a second clutch in said housing arranged to grip and hold said rod in alternation with said lifting clutch, an actuating member for said first clutch extending lengthwise of said housing between the same and said guide tube, and having one end projecting out of said housing, means without said housing and acting on said end of said member and shifting the same endwise for actuating said lifting clutch, and a releasing member also extending lengthwise of said housing between the same and said guide tube, said releasing member having one end disposed adjacent said holding clutch and its other end projecting out of said housing, and independently operable means for engaging the projecting end of said releasing member to move the same lengthwise to disengage said holding clutch from said rod to permit the descent of said copy support.

11. In a copy holder, the combination of a copy support movable up and down, a lift rod secured to said support, a stationary, upright, tubular housing into which said lift rod extends, a lifting clutch which is arranged within said housing and is formed to engage said rod to lift said copy support and has a limited movement lengthwise of said housing, an operating member which is connected to said clutch and extends lengthwise within said housing and projects from the lower end thereof, a stationary holding clutch for said rod to hold said copy support in different positions, and a releasing member which also extends lengthwise within said housing and projects from the lower end thereof, means for moving said operating member lengthwise to actuate said lifting clutch, and means operable independently of said lifting clutch or its operating means for moving said releasing member lengthwise to disengage said holding clutch from said rod.

12. In a copy holder, the combination of a copy support movable up and down, a lift rod secured to said support, a stationary, upright, tubular housing into which said lift rod extends, a lifting clutch which is arranged within said housing about said rod, said clutch comprising an annular member having a downwardly tapered face, clutch elements disposed between said face and said rod, a stationary part within the housing which extends into said clutch member and engages said clutch elements to hold them out of gripping engagement with said rod in one position of said clutch, an actuating member which is fixed to said clutch member and extends lengthwise in said housing and projects beyond one end thereof, and means for moving said actuating member endwise to shift said clutch to disengage said clutch elements from said stationary part and permit them to wedge between said tapered face and said rod to grip and move said rod for elevating said copy support.

13. In a copy holder, the combination of a copy support movable up and down, a lift rod secured to said support, a stationary, upright, tubular housing into which said lift rod extends, a lifting clutch which is arranged within said housing about said rod, said clutch comprising an annular member having a downwardly tapered face, clutch elements disposed between said face and said rod, a tubular stationary member extending lengthwise of said housing which surrounds and guides said rod and which has one end thereof projecting into said clutch member for holding said clutch elements out of gripping engagement with said rod in one position of said clutch, a tubular actuating member which has one end fixed to said clutch member and extends lengthwise in said housing about said stationary guide member with its other end projecting beyond one end of said housing, and actuating means acting on said projecting end of said member to move the same endwise for shifting said clutch to disengage said clutch elements from said guide member and permit them to wedge between said tapered face and said rod to grip and move said rod for elevating said copy support.

14. In a copy holder, the combination of a copy support movable up and down, a lift rod secured to said support, a stationary, upright, tubular housing into which said lift rod extends, a lifting clutch which is arranged within said housing and is formed to engage said rod to lift said copy support and has a limited movement lengthwise of said housing, a holding clutch in said housing for gripping said rod to hold said copy support in different positions, a releasing member extending lengthwise within said housing with one end adjacent said holding clutch and its other end projecting from the remote end of said housing, and independently operable actuating means for moving said member lengthwise to operate said holding clutch to release said rod therefrom and permit the descent of said copy support.

15. In a copy holder, the combination of a copy support movable up and down, a lift rod secured to said support, a stationary, upright, tubular housing into which said lift rod extends, a lifting clutch which is arranged within said housing and has a limited movement lengthwise of said housing and is adapted to grip and lift said rod for elevating said copy support, a holding clutch in said housing for gripping and holding said rod in different positions, a tubular releasing member extending lengthwise in said housing with one end adjacent said holding clutch and its other end projecting from the remote end of said housing, independently operable actuating means for moving said member lengthwise to operate said holding clutch to release said rod therefrom and permit the descent of said copy support, and said releasing member extending about and contacting with said lifting clutch to guide said clutch in its movements.

16. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch and a holding clutch in said tubular housing for respectively lifting said rod and for holding said rod in different positions, an operating member extending from said lifting clutch through said tubular housing into said transverse housing, means arranged in the latter housing and adapted to impart lengthwise movements to said member for operating said lifting clutch, a releasing member extending from said holding clutch through said tubular housing into said other housing, and independently operable means in the latter adapted to move said releasing member lengthwise to disengage said holding clutch from said rod to permit the descent of the copy support.

17. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch arranged to have a limited endwise movement in said tubular housing intermediate of the ends thereof for gripping and elevating said lift rod and copy support, an operating member connected to and extending from said clutch lengthwise in said housing with its lower end projecting into said transverse housing, lever mechanism within the latter and connected to said lower end of said operating member, and means mounted on said frame outside said tubular and transverse housings for actuating said mechanism for imparting endwise movement to said member to operate said clutch.

18. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch arranged to have a limited endwise movement in said tubular housing intermediate of the ends thereof for gripping and elevating said lift rod and copy support, a fixed guide tube extending upwardly through said transverse housing into said tubular housing and terminating below said clutch and which receives and guides said lift rod, an operating member connected to and extending from said clutch lengthwise within said tubular housing and outside said guide tube, and having its lower end projecting into said other housing, lever mechanism within the latter and connected to said lower end of said operating member and having a part extending out of said housing, and actuating means mounted on said frame and outside of said transverse housing connected with said extending part for moving said mechanism to impart endwise movement to said operating member for operating said clutch.

19. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch arranged to have a limited endwise movement in said tubular housing intermediate of the ends thereof for gripping and elevating said lift rod and copy support, an operating member connected to and extending from said clutch lengthwise in said housing with its lower end projecting into said transverse housing, a lever extending transversely within the latter, a pivot in said housing at one side the axis of said lift rod and on which one end of said lever is mounted, said lever having its free end disposed at the opposite side of said axis and extending out of said transverse housing, a connection between the intermediate portion of said lever and said lower end of said operating member, and means engaging said outer extended end of said lever for swinging the same on its pivot to impart endwise movement to said member for operating said clutch.

20. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch arranged to have a limited endwise movement in said tubular housing intermediate of the ends thereof for gripping and elevating said lift rod and copy support, an operating member connected to and extending from said clutch lengthwise in said housing with its lower end projecting into said transverse housing, a lever extending transversely within the latter, a pivot in said housing at one side the axis of said lift rod and on which one end of said lever is mounted, said lever having its free end disposed at the opposite side of said axis and projecting out of said housing, a connection between the intermediate portion of said lever and said lower end of said operating member, and a forwardly extending lever pivoted between its ends on said frame and having one of its ends operatively attached to said projecting end of said other lever, whereby oscillations of said second lever will swing said first lever on its pivot and impart lengthwise movements to said operating member for actuating said clutch.

21. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch arranged in said tubular housing for gripping and elevating said lift rod and copy support, means for actuating said lifting clutch, a holding clutch at the upper end of said tubular housing for holding said rod in different positions, a releasing member extending lengthwise of said tubular housing with one end thereof adjacent said holding clutch, and having its other end projecting into said transverse housing, a lever extending transversely within the latter, a pivot in said housing to which one end of said lever is connected, the free end of said lever being disposed outside said housing, a part on said lever intermediate its ends which is arranged to engage the lower end of said releasing member, and actuating means connected to the free end of said lever which is movable independently of the lifting clutch and its actuating means for causing said part of said lever to lift said operating member to operate said holding clutch and release said rod to permit said copy support to descend.

22. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch arranged in said tubular housing for gripping and elevating said lift rod and copy support, means for actuating said lifting clutch, a holding clutch at the upper end of said tubular housing for holding said rod in different positions, a releasing member extending lengthwise of said tubular housing with one end thereof adjacent said holding clutch, and having its other end projecting into said transverse housing, a lever extending transversely within the latter, a pivot in said housing to which one end of said lever is connected, the free end of said lever being disposed outside said housing, a fixed upwardly projecting part on said lever upon which the lower end of said operating member rests, and means operable independently of said lifting clutch and its operating means for swinging said lever on its pivot to elevate said member to cause said clutch to free said rod and permit the descent of said copy support.

23. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch and a holding clutch in said tubular housing for respectively lifting said rod and for holding said rod in different positions, an operating member extending from said lifting clutch through said tubular housing into said transverse housing, lever mechanism arranged in the latter and connected to said operating member and which is adapted to be actuated to impart lengthwise movements to said member for operating said lifting clutch, a releasing member extending from said holding clutch through said tubular housing into said other housing, and separate, independent operable lever mechanism in the latter engaging said releasing member and which is adapted to be actuated to move the same lengthwise to disengage said rod from said holding clutch.

24. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch and a holding clutch in said tubular housing for respectively lifting said rod and for holding said rod in different positions, an operating member extending from said lifting clutch through said tubular housing into said transverse housing, a pivot arranged in the latter, a lever movably mounted thereon, a connection between said lever and said operating member, means mounted on said frame for swinging said lever, whereby said operating member will be moved to operate said lifting clutch, a releasing member extending from said holding clutch through said tubular housing into said other housing, a second independently movable lever mounted on said pivot and having a part engaging said releasing member, and means mounted on said frame and which is operable independently of said first lever operating means for swinging said second lever, whereby the releasing member will be moved to disengage said rod from said holding clutch.

25. In a copy holder, a stationary frame, a copy support slidable thereon, a lift rod secured to said copy support, a clutch for intermittently engaging and lifting said rod, actuating mechanism operatively connected to said clutch and including a pivoted lever extending transversely of said frame, a forwardly extending lever pivoted between its ends on said frame and having one end movably connected to an end of said first lever, said connection comprising a substantially flat reduced projecting stud on one of said levers which extends into a circular aperture in the other lever and has opposite rounded edges conforming to and engaging the opposite sides of said aperture, whereby said apertured lever can rotate about the other lever in a plane perpendicular to the longitudinal axis of the latter.

26. In a copy holder, a stationary frame, a copy support slidable thereon, a lift rod secured to said copy support, a clutch for intermittently engaging and lifting said rod, actuating mechanism operatively connected to said clutch and including a pivoted lever extending transversely of said frame, a forwardly extending lever pivoted between its ends on said frame and having one end movably connected to an end of said first lever, said connection comprising a substantially flat reduced projecting stud on one of said levers which extends into a circular aperture in the other lever and has opposite rounded edges conforming to and engaging the opposite sides of said aperture, whereby said apertured lever can rotate about the other lever in a plane perpendicular to the longitudinal axis of the latter, a shoulder between said stud and the unreduced part of said lever, and a resilient member connected under tension to and extending between said levers adjacent said connection for holding those portions of said apertured lever which surround said aperture yieldingly against said shoulder.

27. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch and a holding clutch in said tubular housing for respectively lifting said rod and for holding said rod in different positions, an operating member extending from said lifting clutch through said tubular housing into said transverse housing, a releasing member extending from said holding clutch through said tubular housing into said other housing, actuating mechanisms for each of said members arranged in said transverse housing and each including a transverse lever pivoted at one end in the housing and having its other end extending outwardly beyond one side thereof, an actuating lever for each of said mechanisms, said levers being pivoted between their ends and side by side on said frame at one side of said copy support, and a connection between each of said levers and its corresponding transverse lever whereby one of said levers can rotate on said other lever in a plane perpendicular to the longitudinal axis of said other lever when said actuating lever is swung on its pivot to actuate its lever mechanism and clutch.

28. In a copy holder, the combination of a stationary upright frame, a transverse, upright copy support mounted to move up and down thereon, an upright tubular housing on said frame, a narrow housing extending transversely of said frame below said tubular housing and which opens into the same, a lift rod fixed to said copy support and extending downwardly into said tubular housing, a lifting clutch and a holding clutch in said tubular housing for respectively lifting said rod and for holding said rod in different positions, an operating member extending from said lifting clutch through said tubular housing into said transverse housing, a releasing member extending from said holding clutch through said tubular housing into said other housing, actuating mechanisms for each of said members arranged in said transverse housing and each including a transverse lever pivoted at one end in the housing and having its other end extending outwardly beyond one side thereof, a leg extending forwardly from one side of said frame, a pivot on said leg, an actuating lever for each of said lever mechanisms, each of which is mounted between its ends on said pivot and has one end operatively connected to the extended end of its corresponding transverse lever whereby oscillations of said levers will actuate their respective mechanisms and clutch, and resilient means attached at opposite ends respectively to the frame and to the connections between said actuating levers and their respective transverse levers for holding said actuating levers yieldingly in an inoperative position.

29. In a copy holder, a stationary frame having a pair of spaced upright guide rods, a transversely extending copy supporting plate having portions slidingly engaging said rods to guide said support up and down, a transverse upright sheet metal plate fixed to and extending between said guide rods in rear of said copy support, a horizontal line guide extending transversely in front of said copy support and having a hinge rod extending rearwardly alongside said support and thence transversely back of said transverse plate, and said sheet metal plate having an integral, lug bent upon itself and forming a seat to receive and frictionally embrace said end of said hinge rod and in which said rod can pivot, and a clamping bolt extending through the overlapping portions of said lug for varying the gripping action of said seat on said rod.

30. In a copy holder, the combination of a stationary upright frame, a copy support movable up and down thereon, a lift rod secured to and depending from said support, means for engaging and lifting said rod, an upwardly extending guide tube fixed on said frame and into the upper end of which said lift rod extends and is guided in its up and down movements by said tube, a packing on the end of said rod to form a seal between said rod and the walls of said guide tube, a closure member in the lower end of said guide tube, a passage therein connecting the interior of said tube with the atmosphere, and an adjustable member for varying the size of said passage whereby an air cushion is formed in said tube to retard the descent of said copy support, and whereby the descent of said copy support can be varied.

31. In a copy holder, the combination of a frame, a copy support movable up and down thereon, a lift rod fixed to said copy support, a forwardly extending leg having a pivotal connection with said frame which permits said leg to be folded up alongside said copy support, a lifting lever and a release lever pivotally mounted side by side on said leg at one side of said copy support, a lifting clutch engageable with said rod, actuating means for said clutch including a transverse lever, a holding and releasing clutch for said rod, independent actuating means for said clutch also including a transverse lever, said transverse levers each having a pivotal connection respectively with said lifting lever and said release lever, and said pivotal connections being disposed substantially on the pivotal axis of said leg and constructed to permit said lifting and release levers to fold with said leg alongside said copy support.

32. In a copy holder, the combination of a stationary upright frame, a copy support movable up and down thereon, a forwardly extending leg, a screw connecting said leg to said upright frame and forming a pivot about which said leg can turn for permitting relative angular adjustments between said leg and frame, a clamp plate against which said pivot screw acts to clamp the leg in adjusted positions, said plate having a part which engages said frame to prevent said plate from turning and loosening said screw when said leg is swung about its pivot.

33. In a copy holder, the combination of a stationary upright frame, a copy support movable up and down thereon, mechanism on said frame for actuating said support including a holding clutch, a releasing member movable to actuate said clutch to release said copy support, a forwardly extending supporting leg, a connection between said leg and said frame which permits said leg to fold relatively to said frame, a lever pivoted on said frame and operatively connected with said clutch releasing member, an actuating lever mounted on said leg, a connection between said levers whereby said releasing member is moved to release said clutch by operating said actuating lever when said leg and levers are in normal operative position, and which connection when said leg is folded shifts said first mentioned lever to a position in which it holds said holding clutch released and thereby leaves said copy holder free to be moved to its lower position in compact relation to said frame.

34. In a copy holder, the combination of a stationary frame comprising a pair of parallel, spaced, upright guide rods of round cross section, a copy support movable up and down thereon, said support having opposite, inwardly directed, guide grooves of V-shape which straddle said guide rods and engage opposite sides thereof along relatively narrow lines of contact whereby said copy support is guided on said frame and lateral and transverse movements between said frame and copy support are prevented and whereby friction and noise between said copy support and said frame are reduced to a minimum and means for actuating said copy support.

35. In a copy holder, the combination of a copy support movable up and down, a lift rod on said support, a stationary guide tube into which said rod extends through the open, upper end thereof, a reciprocable clutch having loose clutch elements which, in one position of said clutch rest on said end of said guide tube and are held thereby in inoperative relation to said lift rod, means for shifting said clutch lengthwise of said rod to move said elements out of contact with said end of said guide tube and into gripping relation with said rod for moving said copy support, and means for adjusting said guide tube lengthwise to enable the same to be positioned in correct relation to said clutch.

36. In a copy holder, the combination of a copy support movable up and down, a lift rod on said support, a stationary guide which receives and guides said rod, a reciprocable clutch having loose clutch elements which, in one position of said clutch engage a part of said guide and are held thereby in inoperative relation to said lift rod, means for shifting said clutch lengthwise of said rod to move said elements out of engagement with said guide and into gripping relation with said rod for moving said copy support, and means for adjusting said guide for positioning the same in correct relation to said clutch.

37. In a copy holder, the combination of a stationary frame, a copy support movable up and down thereon, a lift rod on said copy support, a reciprocable clutch carried by said frame and movable lengthwise of said rod and having loose clutch elements, a stationary part of said frame which engages said clutch elements in one position of said clutch to hold said elements in inoperative relation to said rod, an operating lever and connections for shifting said movable clutch upwardly whereby said clutch elements are shifted out of contact with said stationary part and into gripping relation with said lift rod for elevating said copy support, said clutch having a part which, when said clutch operating lever is released and said clutch descends, bears upon said clutch elements at the side thereof opposite to said stationary part and acts through said clutch elements and said stationary part to support said connections and thereby form a return stop for said clutch operating lever.

38. In a copy holder, the combination of a stationary frame, a copy support movable up and down thereon, a lift rod on said copy support, a reciprocable clutch carried by said frame extending about said rod and which is movable lengthwise of said rod, and is provided with loose clutch elements, a stationary part of said frame which engages said clutch elements in one position of said clutch to hold said loose clutch elements in inoperative relation to said rod, an operating lever and connections for shifting said movable clutch upwardly whereby said loose clutch elements are shifted out of contact with said stationary part of said frame and into gripping relation with said lift rod for elevating said copy support, said clutch having a resilient member, which when said clutch operating lever is released and said clutch descends, acts through said clutch elements and said stationary part to form a return stop for said clutch operating lever, and said resilient member also acting as a buffer to deaden the sound of the descent of said clutch.

39. In a copy holder, the combination of an upright stationary frame, a copy support movable up and down thereon, a lifting clutch and a holding clutch on said frame for respectively elevating said copy support and for holding the same in different positions, a leg extending forwardly from said frame at one side thereof, a pivot extending through said leg, a pair of levers mounted on said pivot, one on each side of said leg and each operatively connected with one of said clutches, said leg having a laterally offset portion, and the other one of said levers being extended across said offset portion to the inner side of said leg to permit said connections between the levers and clutches to be made and disposed at said inner side of said leg.

40. In a copy holder, the combination of an upright stationary frame, a copy support movable up and down thereon, a lifting clutch and a holding clutch on said frame for respectively elevating said copy support and for holding the same in different positions, a leg extending forwardly from said frame outwardly beyond one side of said support, a lever pivoted between its ends on said leg at the inner side thereof and having one end operatively connected to one of said clutches at that side of said leg, said leg having an outwardly offset portion, and a second lever also pivoted between its ends on said leg at the outer side thereof and which passes through a hole in said offset portion to permit one end of said lever also to be operatively connected with said other clutch at the inner side of said leg.

41. In a copy holder, the combination of a stationary frame, a copy support movable thereon, mechanism on said frame for operating said support including a clutch, a member for actuating said clutch, a lever operatively connected to said member, an operating lever pivoted on said frame and having one end loosely connected to an end of said first lever for actuating the latter, and a tension device attached at one end to one of said levers adjacent its connection with said other lever and at its other end to said frame below said connection, and acting to hold said levers in connected relation and to return the levers to inoperative position after said clutch has been actuated.

42. In a copy holder, the combination of a stationary frame, a copy support movable thereon, mechanism on said frame for operating said support including a clutch, actuating mechanism for said clutch including a transverse lever, a pivot on said frame on which said lever is journalled, a stationary enlargement forming a stop part associated with said pivot at and in contact with one side of said lever, and a resilient member on said pivot at the opposite side of and bearing against said lever to yieldingly press the same against said stationary stop part to prevent rattling when said lever is moved about said pivot.

43. In a copy holder, the combination of a stationary frame, a copy support movable thereon, mechanism on said frame for operating said support including a lifting clutch and a holding clutch, actuating mechanism on said frame for each of said clutches each of said mechanisms including a transverse lever, a pivot on which said levers are journalled side by side in spaced relation, a stationary enlargement forming a stop part associated with said pivot at and in contact with the outer side of each lever, and a resilient spacing member on said pivot extending between and bearing against the inner sides of said levers to yieldingly press said levers against said stationary stop parts to prevent rattling when said levers are moved about said pivot.

44. In a copy holder, the combination of a copy support movable up and down, a lifting clutch and a holding clutch for respectively elevating said copy support and for holding the same in different elevations, and operating mechanism for said clutches including an operating device for each clutch and a rigid connection between said device and its respective clutch, whereby by holding one of said devices in its clutch actuating position and intermittently operating said other device, said support can be lowered step by step.

45. In a copy holder, the combination of a copy support movable up and down, a lift rod secured to said support, a lifting clutch and a holding clutch for respectively engaging said rod to elevate said copy support and for holding the same in different elevations, and operating mechanism for each of said clutches including an operating device and a rigid connection between each mechanism and its respective clutch, whereby, by moving the operating device for said holding clutch to release said rod and actuating said other operating device, said lifting clutch can be actuated to permit a step by step lowering movement of said copy support.

46. In a copy holder, the combination of a movable support, a lifting clutch alternately engageable with and disengageable therefrom for moving said support step by step in one direction, means for actuating said clutch, a holding clutch for said support which is yieldable relatively thereto when said support is moved in the direction stated and which acts to grip and hold said support when said first clutch is disengaged therefrom to prevent a return movement of said support, and means operable independently of said first clutch or its actuating means for disengaging said holding clutch from said copy support to permit movement of the latter in the opposite direction.

PETER GRABLER.